(12) United States Patent
Palffy-Muhoray et al.

(10) Patent No.: US 6,239,778 B1
(45) Date of Patent: May 29, 2001

(54) VARIABLE LIGHT ATTENTUATING DICHROIC DYE GUEST-HOST DEVICE

(75) Inventors: Peter Palffy-Muhoray; Tamas Kosa, both of Kent; Bahman Taheri, Stow, all of OH (US)

(73) Assignee: AlphaMicron, Inc., Kent, OH (US)

( * ) Notice: Subject to any disclaimer, the term of this patent is extended or adjusted under 35 U.S.C. 154(b) by 0 days.

(21) Appl. No.: 09/103,941

(22) Filed: Jun. 24, 1998

(51) Int. Cl.⁷ ................................................ G09G 3/36
(52) U.S. Cl. ................... 345/87; 345/211; 349/33
(58) Field of Search ..................... 345/87, 88, 89, 345/98, 100, 211, 214, 207; 349/13, 14, 25, 34, 35, 36, 33

(56) References Cited

U.S. PATENT DOCUMENTS

| | | | |
|---|---|---|---|
| D. 321,701 | 11/1991 | Nomura et al. | D16/102 |
| 4,150,878 | 4/1979 | Barzilai et al. | 350/344 |
| 4,279,474 | 7/1981 | Belgorod | 350/331 |
| 4,281,903 | 8/1981 | Gharadjedaghi | 350/349 |
| 4,511,225 | 4/1985 | Lipson | 351/49 |
| 4,756,605 | 7/1988 | Okada et al. | 350/347 |
| 4,795,248 | 1/1989 | Okada et al. | 351/158 |
| 4,968,127 | 11/1990 | Russell et al. | 351/44 |
| 5,015,086 | 5/1991 | Okaue et al. | 351/44 |
| 5,067,795 | 11/1991 | Senatore | 359/84 |
| 5,114,218 | 5/1992 | Black et al. | 351/44 |
| 5,172,256 | 12/1992 | Sethofer et al. | 359/77 |
| 5,608,567 | 3/1997 | Grupp | 359/275 |
| 5,710,609 | 1/1998 | Shimada | 349/126 |
| 5,712,721 | 1/1998 | Large | 359/245 |

FOREIGN PATENT DOCUMENTS

| | | |
|---|---|---|
| 61026021 | 2/1986 | (EP) . |
| 01150114 | 6/1989 | (EP) . |

OTHER PUBLICATIONS

F. Gharadjedaghi, A Positive Contrast Guest–Host Display Using a Liquid Crystal of Negative Dielectric Anisotropy, Physics Group 1981 (pp. 127–135).

Nasuno T et al., *Electro–Optical Properties of Guest–Host LC Cell Using Vertically Aligned Nematic LC And Its Application To Reflective Type LCD*, Institute of Electrical Engineers, Research Reports of Kogakuin University, Japan, No. 83 (Oct. 1997), Abstract of pp. 57–62.

*Primary Examiner*—Xiao Wu
(74) *Attorney, Agent, or Firm*—Renner, Kenner, Grieve, Bobak, Taylor & Weber

(57) ABSTRACT

A cell for the electronic attenuation of light suitable for use in eyewear includes spaced substrates coated with a conducting layer, and preferably a passivation layer and an alignment layer. Disposed between the substrates is a guest-host solution comprising a host material and a light-absorbing dichroic dye guest. A power circuit is provided with a power supply connected to the conducting layers. Adjustment of the power supply alters the orientation of the host material which in turn alters the orientation of the dichroic dye. Light is absorbed by the dichroic dye, depending upon its orientation without the need for polarizers.

26 Claims, 4 Drawing Sheets

VARIABLE LIGHT ATTENUATING DICHROIC DYE GUEST-HOST DEVICE

The United States Government has a paid-up license in this invention and may have the right in limited circumstances to require the patent owner to license others on reasonable terms as provided for by the terms of Contract No. F41624-97-C-6010, awarded by the Department of the Air Force.

TECHNICAL FIELD

The present invention generally relates to a dichroic dye guest-host cell with electronically attenuated light transmission. More specifically, the present invention relates to a cell having light absorbing dichroic dyes dissolved or suspended in a host solution.

BACKGROUND ART

On the market today there are a lot of devices, particularly sunglasses, that have photosensitive light transmissivity. Some of these devices use chemical compounds that enter an excited state upon exposure to light—when in this excited state, they absorb more light. The primary drawback of this technology is that these compounds are slow to respond to a change in light conditions. For example, a sunglass wearer driving into a tunnel on a sunny day will have glasses that are too dark (too light absorbent) upon entry and too clear (too light transmissive) upon exiting the tunnel due to a slow change in light absorptivity. As a result, the wearer is put in an uncomfortable and potentially dangerous situation.

Sunglasses that use liquid crystals are also known. Typically, a liquid crystal cell is placed between two polarizing layers. The liquid crystal modifies the polarization state of the transversing light. The polarizers, not dyes, are used to absorb light. The only use of dyes in the prior art is non-functional, generally for tint, as exemplified by U.S. Pat. No. 4,968,127. At least two major drawbacks to this construction is, first, that transmittance of light depends on the viewing angle, and second, it is hard to implement on a plastic substrate. As is well known, polarizers significantly reduce the viewing angle of the cell. In addition, the transmittance of light is typically too small for use in low lighting conditions. In U.S. Pat. No. 5,015,086, for example, the highest transmission reported was 35%.

Therefore, there is a need for a device where the transmittance of light is constant at all viewing angles, where attenuation of transmitted light is continuously and rapidly controllable, and where the device can be implemented on plastic substrates.

SUMMARY OF THE INVENTION

It is therefore an object of the present invention to provide a device capable of continuous attenuation of light transmission without the need for polarizing the light.

It is another object of the present invention to provide a device capable of rapid attenuation of light transmission.

It is yet another object of the present invention to provide a device with controllable sensitivity to polarized or unpolarized light.

It is still another object of the present invention to provide a device with controllable transmittance and controllable response time.

It is a further object of the present invention to provide a fail-safe device, i.e., one with high light transmittance when no electrical power is supplied.

It is another object of the present invention to provide a guest-host system that can be used with glass or plastic substrates.

It is still a further object of the present invention to provide a device that can be designed to accommodate any desired color or tint.

At least one or more of the foregoing objects, together with the advantages thereof over known methods and articles, which shall become apparent from the specification which follows, are accomplished by the invention as hereinafter described and claimed.

In general, the present invention provides a variable light attenuating dichroic dye guest-host device comprising a pair of opposed substrates, each substrate having a conducting layer facing the other substrate, a host material such as a liquid crystal having a guest dichroic dye dispersed therethrough, the guest-host material received between the substrates, and a power circuit having a variable voltage supply connected to the conducting layers, wherein adjustment of the variable voltage supply alters the light transmission properties of the cell by adjusting the orientation of the dichroic dye.

The present invention also provides a polarizer-free variable light attenuating device, comprising a pair of opposed substrates, each substrate having a conducting layer facing the other substrate, a host material received between said substrates, a power circuit having a variable voltage supply connected to the conducting layers, wherein adjustment of the variable voltage supply alters the orientation of the host material without absorbing or polarizing any light transmitted through the pair of opposed substrates, and a dichroic dye guest dispersed through the host material, wherein the molecular axis of the dichroic dye orients with respect to the molecular axis of the host material such that a change in the orientation of the host material causes the dichroic dye guest to change absorption of transmitted light through the pair of opposed substrates.

PREFERRED EMBODIMENT FOR CARRYING OUT THE INVENTION

Figure 1A:
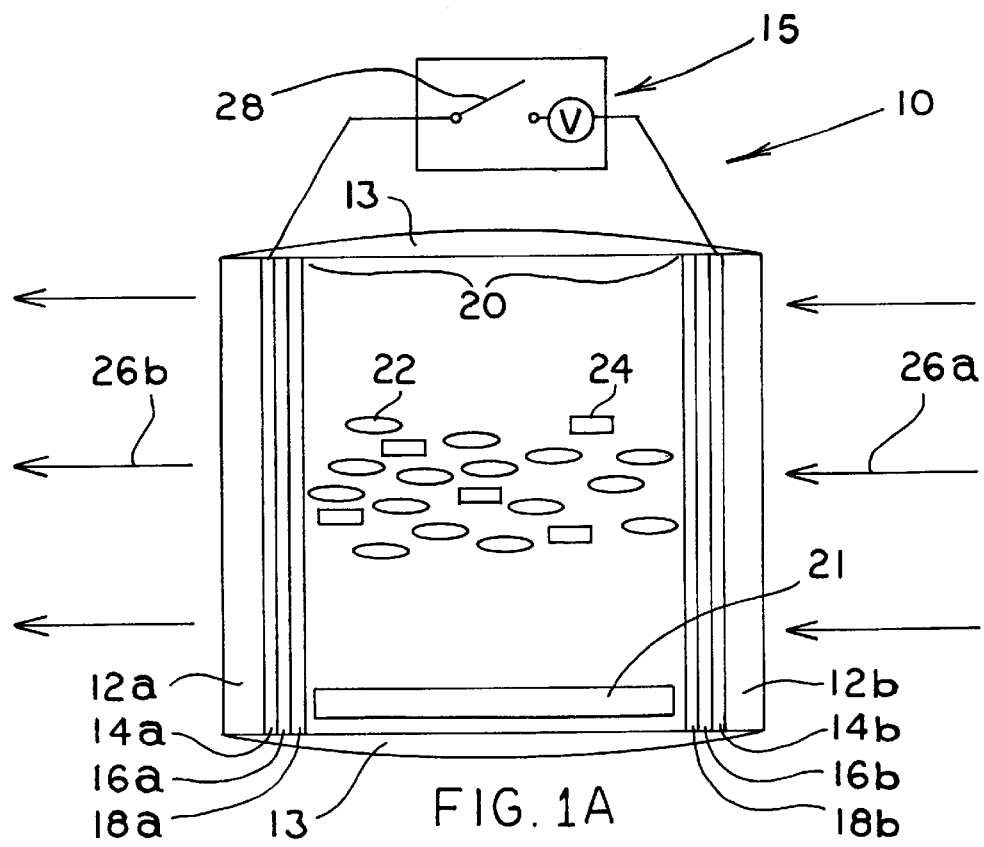
FIGS. 1A and 1B are enlarged schematic cross-sectional representations of a cell according to the present invention, either in the absence or in the presence of an electric field, respectively.
Figure 1B:
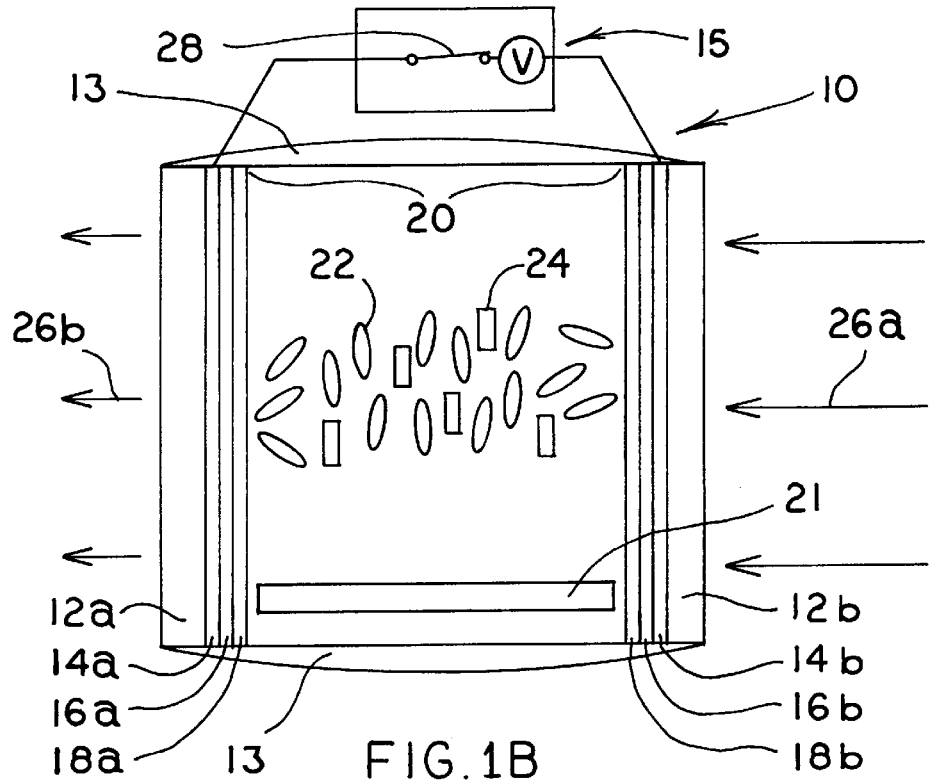

An electronically controlled cell has now been developed, whereby light transmission is continuously controllable. As seen in FIGS. 1A–B, a variable light attenuating dichroic dye guest-host cell according to the present invention is designated generally by the numeral 10. The cell 10 includes two substrates, 12a, 12b, preferably with a substantially constant separation between them and enclosed on all sides by a sealing material 13, such as a two-component epoxy. As will be discussed in further detail below, a solution of dichroic dye and a liquid crystalline material is disposed between the substrates 12a and 12b, Substrates 12a, 2b are light transmissive materials, either the same or different, that are preferably durable, such as glass or plastic. The inner surfaces of the substrates are coated with a conducting layer, 14a, 14b, such as indium tin oxide (ITO). Both conducting layers 14a and 14b are connected to a power circuit 15. The power circuit 15 includes at least a variable voltage supply which is represented schematically in FIGS. 1A and 1B by the encircled V. Coating the inside of each conducting layer 14 is an optional passivation layer (also known as an insulating layer or "hard coat"), 16a, 16b, comprising, for example, a Si, Ti alcoxide. The primary purpose of passivation layer 16a, 16b is to minimize the possibility of a short circuit between the conducting layers 14a and 14b. The innermost layer, disposed over the passivation layer 16, is an alignment layer, 18a, 18b, which can also act as a passivation layer.

Substrates 12a, 12b can be planar or curved. Although the distance between substrates 12a, 12b has no inherent limitations, it has substantial ramifications on properties of the cell. If the host is a liquid crystal material, increasing the distance between the substrates 12a and 12b tends to reduce the possibility of making a polarization insensitive device; decreasing the distance tends to decrease the light-absorption capacity of the cell and increase the difficulty of manufacturing. This distance defines a cell thickness 20 and is preferably from about 5 to about 20 $\mu$m, and more preferably from about 8 to about 12 $\mu$m. To aid in maintaining the separation, optional spacers 21, such as glass or plastic rods or beads, may be inserted between the substrates 12a and 12b.

The guest-host solution of the present invention includes a guest dichroic dye 24 in a liquid crystal host material 22. Dichroic dye 24 can be any organic molecule (or mixture of molecules) whose absorption of polarized light strongly depends on the direction of polarization relative to the absorption dipole in the molecule. Dichroic dye 24 can have positive dichroism in which an absorption maximum occurs when the polarization is parallel to the long molecular axis of the dye molecule and an absorption minimum occurs when the polarization is perpendicular to the long axis. The opposite is true when dichroic dye 24 has a negative dichroism. Preferably, dichroic dye 24 is chemical-, temperature-, and UV-stable. By way of example only, dichroic dye 24 can include azo dyes, anthraquinone dyes or combinations thereof, such as S428 (Mitsui Chemical Co., Purchase, N.Y.), a neutrally colored mixture of dyes. Liquid crystals are inherently birefringent which can result in a polarization sensitivity of the device. Preferably, liquid crystal material 22 is either chiral nematic or achiral nematic supplemented with a chiral dopant. The type of liquid crystal material 22 may include more chiral material, if low polarization sensitivity is desired, or less chiral material if greater sensitivity is desired. The use of about 1 to about 3 weight percent CB-15, for example, greatly reduces the polarization sensitivity of cell 10. One of ordinary skill in the art would realize that if the pitch is too short, however, it becomes difficult to control the texture.

Therefore, the guest-host solution comprises a liquid crystalline material and a dichroic dye. The solution can contain as much as 100 percent liquid crystalline material, but only if it is also dichroic. The maximum amount of dichroic dye that can be used is limited only by its solubility in the host, generally less than about 15 weight percent in liquid crystals. Preferably, the solution contains 0 to 10 weight percent, and more preferably about 3 to 5 weight percent dichroic dye. The solution may optionally contain other materials such as dyes for tint or polymer for strength.

Cell 10 is either in a resting state, in which no voltage is applied, or in an energized state, in which a voltage is applied across two substrates. The present invention can be constructed so that the application of a voltage can either increase or decrease the transmittance of light. It is envisioned, however, that a preferred embodiment will have peak light transmittance in the resting state as seen in FIG. 1A, and minimal light transmittance in the active state as seen in FIG. 1B. This can be achieved by use of either a homeotropic surface treatment for alignment layers 18a,b in conjunction with a dye having positive dichroism and a liquid crystal material with negative dielectric anisotropy, as shown in FIGS. 1A and 1B, or by use of a planar surface treatment for alignment layers in conjunction with a liquid crystal material of positive dielectric anisotropy and a dye having negative dichroism.

In one application of the present invention, cell 10 constitutes the lens of a pair of eyewear, such as sunglasses. One advantage of the present invention, as embodied in eyewear, is that it is "fail safe;" should the power source fail, the user of the eyewear is provided with maximum visibility. As will be discussed in further detail, the power circuit 15 includes a photocell used as a power source. Thus, in minimal light conditions, the power circuit 15 functions as an open switch to remove application of an electric field to the conducting layers 14a, 14b. In maximum light conditions, the power circuit 15 functions as a closed switch to apply an electric field across the conducting layers 14a,b and affect the behavior of the host liquid crystal material 22 and the dichroic dye 24.

To create a highly light-transmissive resting state, the director of the liquid crystal molecules should be relatively parallel to the majority of the incoming light rays, as depicted in FIG. 1A. To achieve this, alignment layers 18a, 18b are treated so as to produce a homeotropic texture of the material 22, with no electric field applied. As a result of the orientation of liquid crystal material 22, the molecules constituting dichroic dye 24 tend to orient their molecular axis parallel to the director of liquid crystal material 22. This condition is schematically represented by an open switch 28 in the power circuit 15.

When the molecules constituting the host liquid crystal material 22 are subject to an electric field, such as by an application of a voltage across conducting layers 14a, 14b, the director changes from one that is relatively perpendicular to the substrate surfaces to one that is less perpendicular, or more parallel, as depicted in FIG. 1B. Consequently, the molecules of dichroic dye 24 are caused to mimic the orientation of the molecules of the host liquid crystal material 22 and the absorption by dichroic dye 24 of entering light 26a passing through cell 10 increases. The net result is a decrease in transmitted light 26b in the energized state, represented schematically in FIG. 1B by a closed switch 28 in the power circuit 15.

The present invention could also include polymerizable monomers to provide a polymer network in order to stabilize the cell, making it more resistant to mechanical pressure. To create a network, monomers are added to the host liquid crystalline solution, preferably from about 1 to about 10%, more preferably from about 1 to about 2%.

It is envisioned that a preferred application of the present invention would be for sunglasses, helmet visors, or other types of protective eyewear. It is also envisioned that the present invention could be used to protect any light-sensitive object, particularly sensors such as video cameras. Furthermore, while use of one or more polarizers are not necessary to meet the objects of the present invention, their supplemental use could be advantageous in some applications to further enhance the light absorption capacity of the present invention.

EXAMPLE

A variable light attenuating dichroic dye guest-host device was prepared according to the following protocol. Test cells were prepared using as the substrates a pair of 1 mm thick glass plates. One side of each substrate was pre-coated by the manufacturer, Donnelly Applied Films (Boulder, Colo.), with indium tin oxide (ITO), which acts as a transparent conducting layer. On top of the ITO coating, a passivation layer of a Si, Ti alcoxide-based material (AT720 from Nissau Chemical, Rolla, Mo.) was coated by the well-known technique of spin coating and subsequently heated at 200° C. for one hour. An alignment layer, silane was then deposited on top of the passivation layer by spin coating. This process provides a homeotropic surface alignment. Next, 5 μm diameter glass rods suspended in methanol (obtained from EM Industries, Hawthorne, N.Y.) were sprayed onto one of the substrates, then the two substrates were glued together using a UV-curable epoxy (N068 from Norland Products, Inc., New Brunswick, N.J.).

The guest-host solution was prepared by mixing the liquid crystalline material ZLI2806 (EM Industries, Hawthorne, N.Y.) and S428 neutral dye mixture and the chiral dopant CE2 (EM Industries) in a weight ratio of 95.5:3:1.5, respectively. The liquid crystalline solution was then inserted into the cell by capillary action, the cell was sealed using the UW-curable epoxy, and electric leads were soldered to the ITO electrodes.

Figure 2:
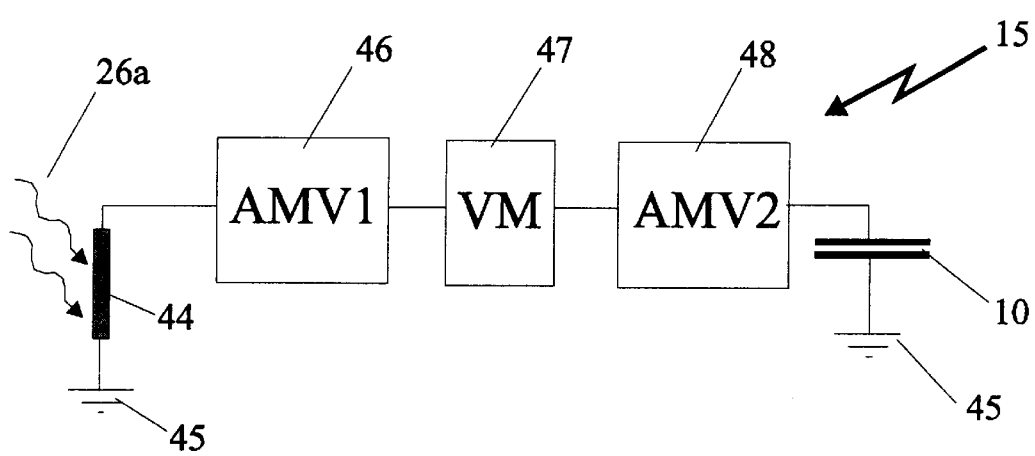
FIG. 2 is a schematic diagram of a power circuit employed in the present invention.

As seen in FIG. 2, the power circuit 15, which controls application of a voltage to the cell 10, includes a photocell 44 which has one end connected to ground 45. The photocell 44 is configured to generate a maximum DC voltage value in the presence of light 26a, and a minimal or no DC voltage value in the absence of ambient light present. In other words, the photocell 44 adjusts its voltage output depending upon the amount of ambient light. In the preferred embodiment, the photocell 44 generates about 3 volts DC. The voltage output by the cell 44 is received by an astable multivibrator 46 to convert the DC voltage to an AC voltage. The multivibrator 44 is connected to a voltage multiplier 47 to amplify the voltage value from 3V DC to 6V DC. Accordingly, the output of the multiplier is received by an astable multivibrator 48 which outputs 6V AC. The voltage generated is then applied to the cell 10 via electrodes connected to the conducting layers 14a,b. The opposite side of the cell 10 is connected to ground 45. As discussed previously, application of the voltage alters the orientation of the host liquid crystal material 22 and the dichroic dye 24. The power circuit 15 is ideally suited for cell 10 employed in sunglasses or selfcontained assemblies. Of course, other circuit configurations with appropriate power sources may be employed. In this embodiment, the multivibrators 46 and 48 were built using CMOS NAND gates and an external RC timer. All the necessary logic gates are commercially available as a package in one integrated circuit.

Figure 3:
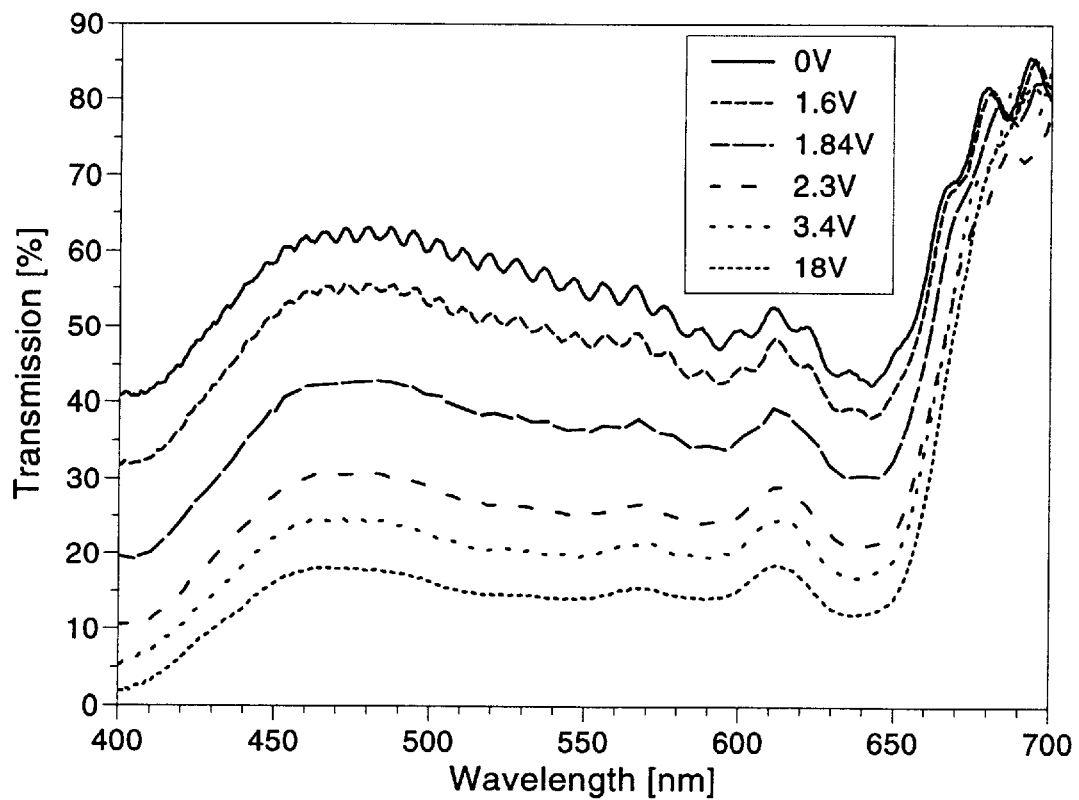
FIG. 3 is a graph showing light transmission percentages through a cell at different levels of applied voltage over a range of wavelengths.

As seen in FIG. 3, light transmission through the cell 10 was measured as a function of applied voltage and the wavelength of the incoming light. As seen in this FIG., depending upon the wavelength of the incident light and voltage applied to the cell 10, the transmission of light may range anywhere from about 2% to about 85%.

Figure 4:
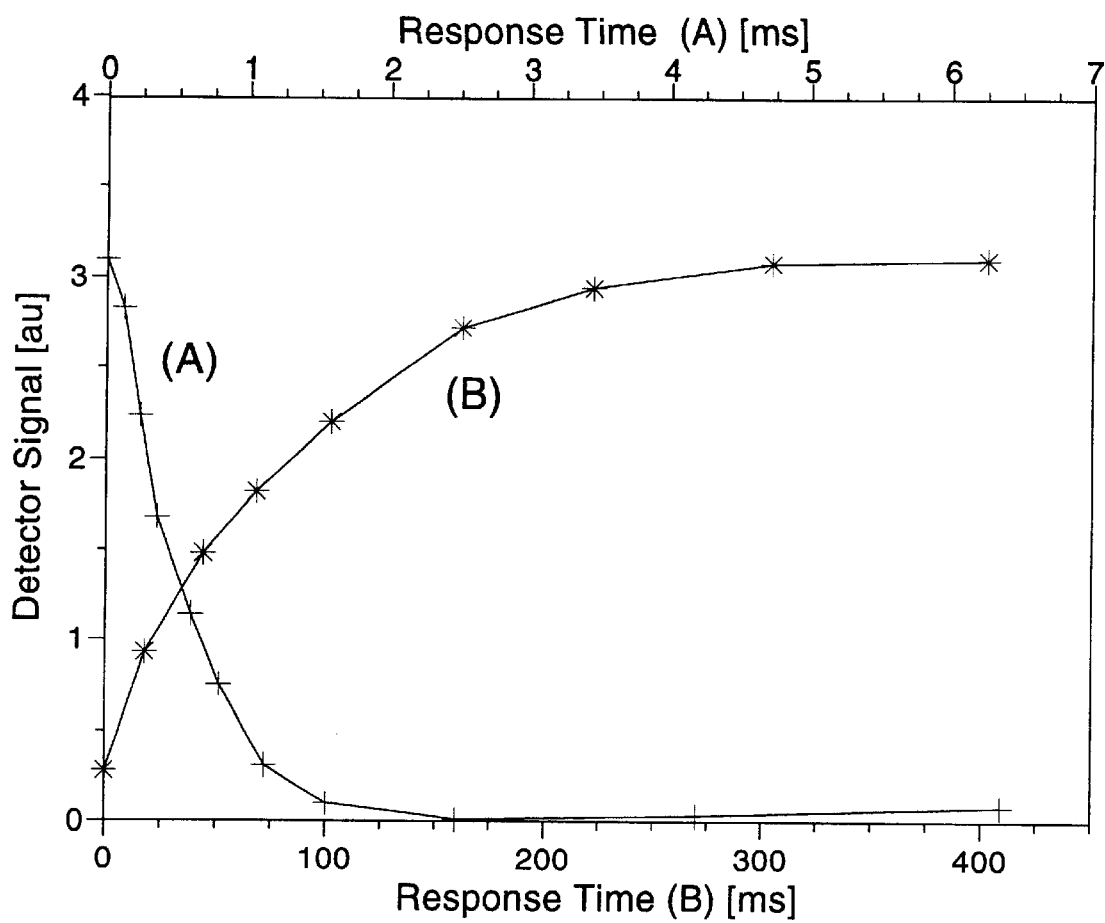
FIG. 4 is a response curve showing light transmission of the cell over time.

The rate of attenuation—the change in the magnitude of light transmission over time—is depicted in FIG. 4 for the cell 10 employing the power circuit 15. Curve A indicates a rapid decrease in light transmission within 2 ms upon the application of 10 V to the cell 10. Curve B indicates a rapid increase in light transmission within 25–100 ms after the voltage was removed from the cell 10.

Based upon the foregoing disclosure, the advantages of the present invention are readily apparent. By employing a variable power source, which generates a variable voltage value based on the amount of ambient light, the present invention provides a dichroic dye based device with variable light attenuating properties without the need for polarizers. Accordingly, the present invention allows for use of dichroic dye material as sunshades or transmittance reducing lenses which have a constant response over a large viewing angle. Accordingly, the present invention provides for a fail-safe operation wherein variable electrical power allows for unshaded viewing. Additionally, the cell or lenses may be adjusted and provided with any color of tint desired depending upon the dichroic dye employed. Accordingly, the cell 10 may be employed in the form of goggles or visors, for example, by pilots, motorcyclists, skiers, and the like. It is also anticipated that the present invention may be employed to protect sensors other than the human eye against a variety of laser and other light emmissive threats.

Based upon the foregoing disclosure, it should now be apparent that the use of the cell and its method of manufacture described herein will carry out the objects set forth hereinabove. It is therefore to be understood that the scope of the invention shall include all modifications and variations that may fall within the scope of the following claims.

What is claimed is:

1. A variable light attenuating dichroic dye guest-host device for variably attenuating at least two polarization components of impinging light comprising:
    a pair of opposed substrates, each said substrate having a conducting layer facing the other substrate;
    a host solution having a guest dichroic dye dispersed therethrough to form a guest-host solution received between said substrates; and
    a power circuit having a variable voltage supply connected to said conducting layers, wherein adjustment of said variable voltage supply alters the polarization sensitivity and light transmission properties of the cell by adjusting the orientation of said host solution and dichroic dye such that one polarization component of the impinging light can be variably absorbed at a different rate than another polarization component of the impinging light.

2. The device according to claim 1, further comprising:
    an alignment layer disposed on each said conducting layer to orient said host material in one texture when no electric field is applied and wherein application of an electric field alters the orientation of said host solution and said dichroic dye and said alignment layer determines which of the at least two polarization components is absorbed to a greater extent than the other.

3. The device according to claim 1, further comprising a passivation layer between each said conducting layer and each said alignment layer.

4. The device according to claim 1, wherein light transmissivity is relatively high when no electricity is produced by said power circuit and relatively low when electricity is produced by said power circuit.

5. The device according to claim 1, wherein said power circuit comprises a photocell which generates a voltage value in the presence of ambient light.

6. The device according to claim 5, wherein said photocell generates a variable voltage value depending upon an amount of ambient light, wherein said variable voltage value alters the orientation of said host material and said dichroic dye to adjust the light transmission properties and vary the polarization attenuation properties of the device.

7. The device according to claim 5, wherein said power circuit further comprises:
   an astable multivibrator to convert a DC voltage output generated by said photocell to an AC voltage received by said conducting layers.

8. The device according to claim 7, wherein said power circuit further comprises:
   a voltage multiplier to receive said AC voltage output generated by said astable multivibrator for generating an amplified DC voltage signal; and
   a second astable multivibrator for receiving said amplified DC voltage signal and generating an amplified AC voltage received by said conducting layers.

9. The device according to claim 1, further comprising a plurality of spacers disposed between said substrates which are made of plastic.

10. The device according to claim 9, wherein the first and second substrates are substantially planar.

11. The device according to claim 9, wherein the first and second substrates are curved.

12. The device according to claim 1, wherein said host solution includes chiral nematic liquid crystal material.

13. The cell according to claim 1, wherein said guest-host solution includes from about 15 to 100 percent of a liquid crystal material and from 0 to about 15 percent of said dichroic dye.

14. The device according to claim 1, wherein said guest-host solution includes from about 95 to about 97 percent of said host material and from about 5 to about 3 percent of said dichroic dye.

15. The device according to claim 1, wherein said guest-host solution has a liquid crystal material with a negative dielectric anisotropy and said dichroic dye has positive dichroism.

16. The device according to claim 1, wherein said alignment layers are treated to provide a homeotropic surface alignment.

17. The device according to claim 12, wherein said liquid crystal material has a birefringence greater than or equal to 0.12.

18. The device according to claim 12, wherein said liquid crystal material has a spontaneous pitch value that is greater than 4 times the thickness between said substrates.

19. A polarizer-free variable light and polarization component attenuating device, comprising:
   a pair of opposed substrates, each said substrate having a conducting layer facing the other substrate;
   a host material received between said substrates;
   a power circuit having a variable voltage supply connected to said conducting layers, wherein adjustment of said variable voltage supply alters the orientation of said host material; and
   a dichroic dye guest dispersed through said host material, wherein the molecular axis of said dichroic dye orients with respect to the molecular axis of said host material such that a change in the orientation of said host material causes said dichroic dye guest to change absorption of transmitted light through said pair of opposed substrates such that one polarization component of the impinging light is absorbed at a different rate than another polarization component of the impinging light.

20. A cell for attenuating light and its polarization components, comprising:
   a pair of opposed substrates having a gap therebetween;
   a conductive layer disposed on each said substrate and facing said gap;
   a passivation layer disposed on each said conductive layer and facing said gap;
   an alignment layer disposed on one said passivation layer and facing said gap;
   a guest-host solution received in said gap, wherein said solution includes a host liquid crystal material, which has liquid crystal directors, through which is dispersed a guest dichroic dye, said alignment layers orienting said host liquid crystal material with respect to said substrates and said liquid crystal directors with respect to one another; and
   a power circuit having a variable voltage supply connected to said conductive layers, characterized in that adjustment of said variable voltage supply varies said guest-host solution between a first and a second condition,
   wherein said first condition, without voltage applied, results in said guest-host solution exhibiting a highly light-transmissive resting state, and
   wherein said second condition, with a variable voltage applied, re-orients said liquid crystal directors so as to re-orient a molecular axis of said dichroic dye to variably attenuate more of one polarization component than another polarization component of the light.

21. The cell according to claim 20, wherein said power circuit comprises:
   a photocell that generates a variable voltage value depending upon and amount of ambient light, which in turn results in variation between said first and second conditions.

22. The cell according to claim 20, wherein said host liquid crystal material includes chiral material.

23. The cell according to claim 22, wherein said liquid crystal material has a birefringence greater than or equal to 0.12.

24. The cell according to claim 22, wherein said liquid crystal material has a spontaneous pitch value that is greater than 4 times the thickness between said substrates.

25. The cell according to claim 22, wherein said alignment layers are treated to provide a homeotropic surface alignment and said host liquid crystal material has a negative dielectric anisotropy and said dichroic dye has positive dichroism.

26. The cell according to claim 22, wherein said alignment layers are treated to provide a planar surface alignment and said host liquid crystal material has a positive dielectric anisotropy and said dichroic dye has negative dichroism.

* * * * *